United States Patent [19]
Giousos

[11] Patent Number: 5,875,826
[45] Date of Patent: Mar. 2, 1999

[54] UNIVERSAL HAND TOOL JOINER DEVICE

[76] Inventor: Vasilios Giousos, 45-35 47th St., Apt. 1F, Woodside, N.Y. 11377

[21] Appl. No.: 842,733

[22] Filed: Apr. 16, 1997

[51] Int. Cl.[6] ..................................................... B27B 17/14
[52] U.S. Cl. .................................. 144/136.95; 144/154.5
[58] Field of Search ............................. 30/122, 383, 300; 144/136.95, 154.5

[56] References Cited

U.S. PATENT DOCUMENTS

| | | |
|---|---|---|
| 4,111,060 | 9/1978 | Nerini . |
| 4,819,335 | 4/1989 | Alexander ............................. 20/122 X |
| 4,949,463 | 8/1990 | Chen . |
| 4,972,589 | 11/1990 | Povieski . |
| 5,239,758 | 8/1993 | Lindell . |
| 5,313,709 | 5/1994 | Pabon-Delgado . |
| 5,392,519 | 2/1995 | Inoue et al. . |

*Primary Examiner*—Douglas D. Watts
*Attorney, Agent, or Firm*—Michael I. Kroll

[57] ABSTRACT

A universal hand tool joiner device (10) comprising a rotary power source (12). A utility attachment (14) is coupled to and driven by the rotary power source (12). The utility attachment (14) will perform longitudinal precision wood working tasks, such as making apertures in ends of wood pieces (16), in which a dowel can be inserted into two apertures in abutting ends of two wood pieces (116) to hold them together.

4 Claims, 9 Drawing Sheets

UNIVERSAL HAND TOOL JOINER DEVICE

BACKGROUND OF THE INVENTION

1. Field of the Invention

The instant invention relates generally to electric power tools and more specifically it relates to a universal hand tool joiner device. The universal hand tool joiner device is provided, in which various attachments can engage with a portable electric motor unit to cut slots and drill holes in abutting ends of wood pieces, so that flat dowels can be used to hold the wood pieces together.

2. Description of the Prior Art

Numerous electric power tools have been provided in prior art. For example, U.S. Pat. Nos. 4,111,060 to Nerini; 4,949,463 to Chen; 4,972,589 to Povleski; 5,239,758 to Lindell; 5,313,709 to Pabon-Delgado and 5,392,519 to Inove et al. all are illustrative of such prior art. While these units may be suitable for the particular purpose to which they address, they would not be as suitable for the purposes of the present invention as heretofore described.

A drill attachment for coverting rotary motion of a drill chuck into reciprocatory motion includes a tool support member movable longitudinally along a guide bracket and having one surface with a plurality of cam surfaces thereon. The movement thereof is in response to rotation of an elongated shaft having one end portion thereof received in the drill chuck and an enlarged portion on the other end of the shaft with a plurality of cam surfaces thereon and in engagement with the cam surfaces on the one surface of the tool support member. The cam surfaces on the tool support member and the cam surfaces on the enlarged portion of the shaft are resiliently retained in engagement, one with the other.

A sawing device attachable to regular electric drill, having a main body with a revolving shaft set thereinside to protrude therebeyond to drive an inner spiral gear set to rotate, so as to further let an eccentric strut on a longitudinal gear push and pull a front link rod to make reciprocating motion to further carry the front prolonged saw blade to saw. The main body comprising a drill sleeve for fixation with regular electric drill tool to let the revolving shaft be fixedly connected with the revolving body of an electric drill, so as to make use of the revolving power of the electric drill to drive the sawing device to saw.

Attachments for a power source such as a rotary drill. Such attachments can be fixedly secured to the power source. Turning power on to the source drives a shaft which drives a gear mechanism which drives a utility wood working head, such as a circular saw or power sander. The power source may be turned on indirectly by a false trigger mechanism slideably attached to a housing, so enclosing the drive shaft and assisting to support the apparatus.

A sawing device is attachable to an electric hand drill. The hand drill can be operated by either alternating current or direct current, using a battery. The battery operated drill eliminates the need for electrical cords, so it can be used anywhere. The saw bar may be made of material such as plastic that requires no lubricating oil, is lighter and less abrasive than conventional metal saw bars. There is also a non-metallic insert that will attach to a metal saw bar. This insert may go into the conventional metal saw bars with the same advantages as above. The hand drill rotation is transferred through a connecting shaft to the sprocket that drives the cutting chain, which travels on a chain bar with a single sprocket.

A hack saw attachment for converting a power driven saber saw or other reciprocable tool to a power driven hack saw includes a plate having a hack saw frame fixed perpendicular thereto. The sole plate of a saber saw is provided with openings for releasable connectors whereby the plate of the attachment is easily connected to the saber saw sole plate. The hack saw frame carries guides at its inner and outer ends, the inner end of the blade passes through the inner guide for attachment to the saber saw arbor. The outer guide carries a second arbor for the outer end of the blade and a spring acts on the outer arbor to ensure proper tension of the hack saw blade during cutting. The hack saw frame carries a handle to facilitate manual reciprocation of the hack saw as it is also reciprocated by the saber saw drive, to ensure even wear of the hack saw teeth along the length of the blade.

A reciprocating saw includes a body and a slider supported by the body such that the slider is slideably movable in a longitudinal direction of the body and is pivotally movable in a vertical direction. A first motion conversion mechanism is operable to convert the rotational movement of the rotary member into a reciprocal movement of the slider in the longitudinal direction. A second motion conversion mechanism is operable to convert the rotational movement of the rotary member into a reciprocal pivotal movement of the slider in the vertical direction. The second motion conversion mechanism includes an arm having one end vertically pivotally connected to the slider. An actuating member is rotatable with the rotary member and has an abutting surface on which the other end of the arm slideably abuts. The abutting position of the other end of the arm on the abutting surface is varied as the actuating member is rotated, so that the vertical position of one end of the arm is varied.

SUMMARY OF THE INVENTION

A primary object of the present invention is to provide a universal hand tool joiner device that will overcome the shortcomings of the prior art devices.

Another object is to provide a universal hand tool joiner device in which a mini-chain saw attachment can be removably engaged with a portable electric motor unit to cut slots in abutting ends of wood pieces, so that flat dowels can be used to hold the wood pieces together.

An additional object is to provide a universal hand tool joiner device in which a drill attachment can be removably engaged with the portable electric motor unit to drill holes in abutting ends of wood pieces, so that cylindrical dowels can be used to hold the wood pieces together.

A still additional object is to provide a universal hand tool joiner device in which a circular saw attachment can be removably engaged with the portable electric motor unit to also cut slots in abutting ends of wood pieces, so that the flat dowels can be used to hold the wood pieces together.

A further object is to provide a universal hand tool joiner device that is simple and easy to use.

A still further object is to provide a universal hand tool joiner device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein.

Similar reference characters denote corresponding features consistently throughout the attached drawings.

DETAILED DESCRIPTION OF THE PREFERRED EMBODIMENTS

Figure 1:
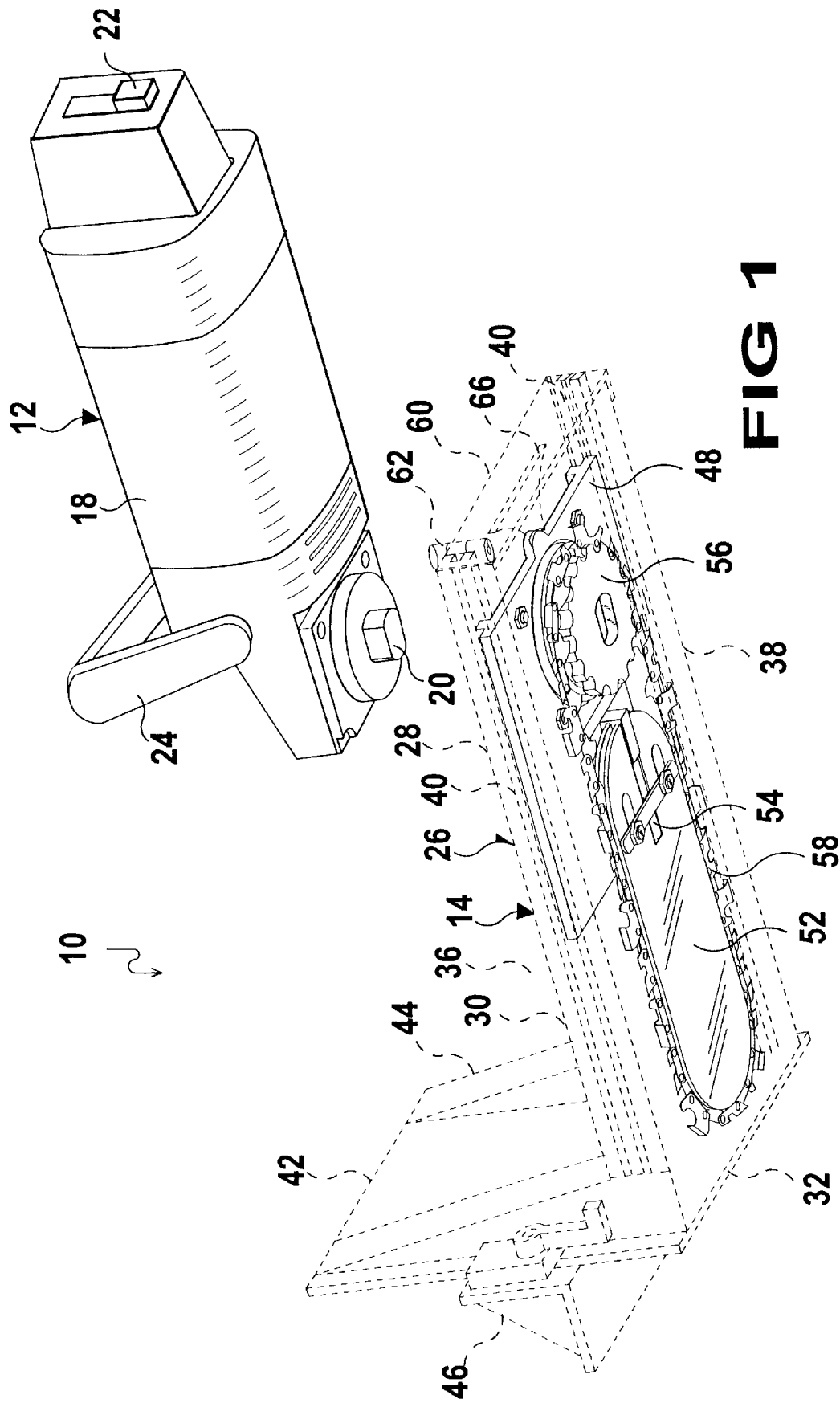
FIG. 1 is a perspective view of a first embodiment of the instant invention with the housing shown in phantom and ready to engage with a portable electric motor unit.
Figure 2:
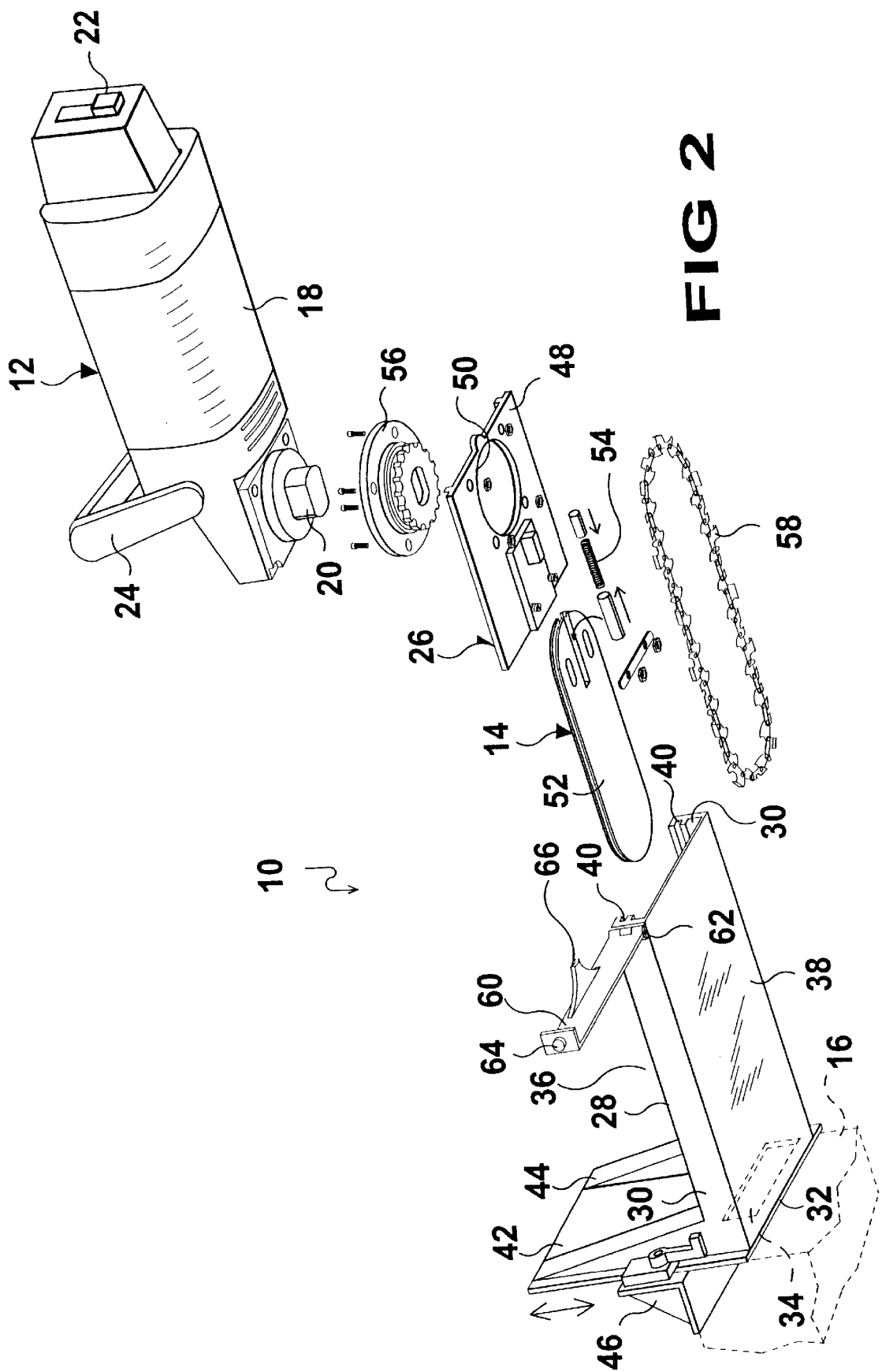
FIG. 2 is a perspective view similar to FIG. 1, showing the various parts of the first embodiment exploded apart and the housing shown solid.
Figure 3:
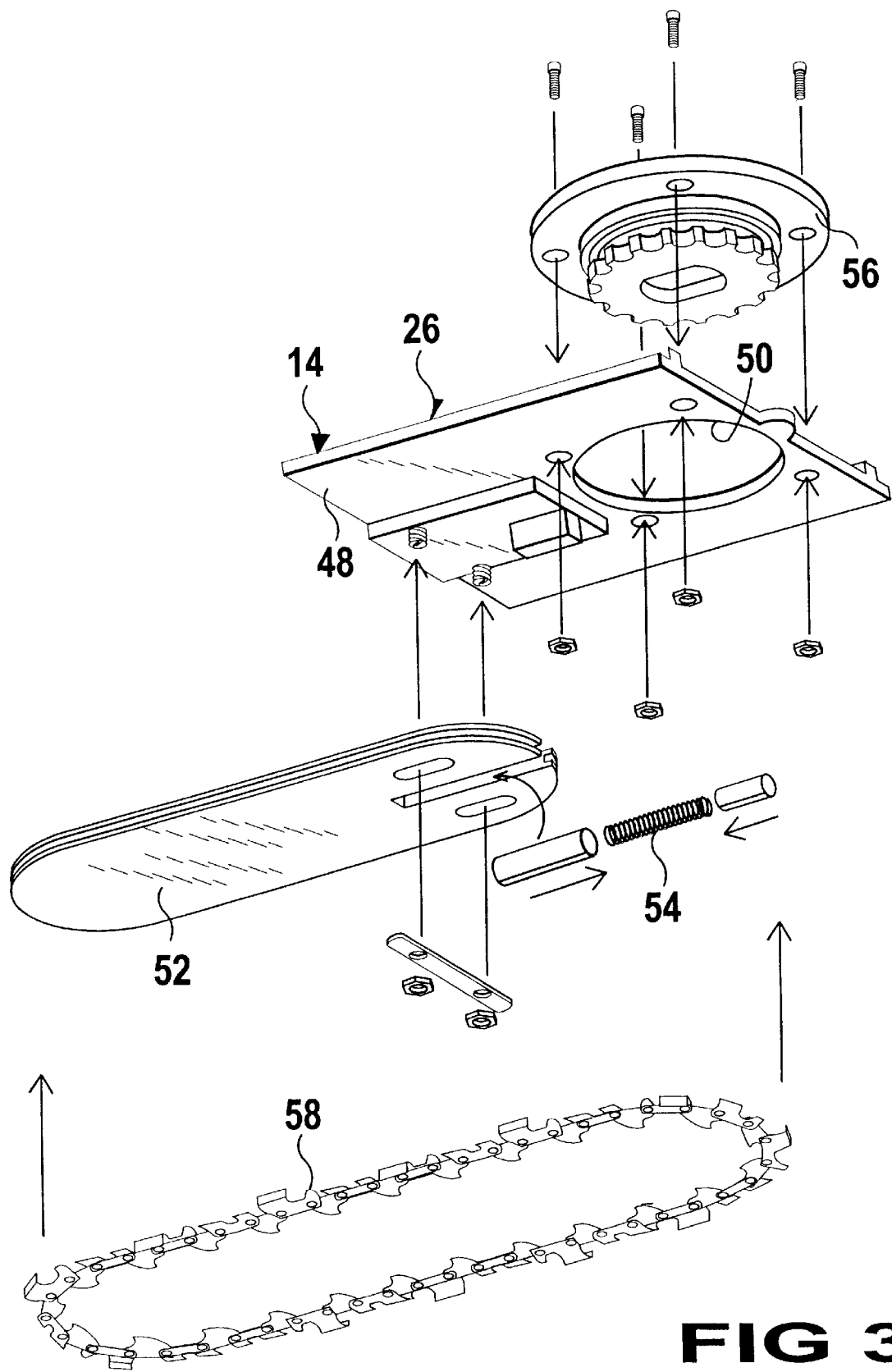
FIG. 3 is an enlarged exploded perspective view of the various parts of the first embodiment with the housing removed therefrom.

Turning now descriptively to the drawings, in which similar reference characters denote similar elements throughout the several views, FIGS. 1 through 3 illustrate a universal hand tool joiner device 10 comprising a rotary power source 12. A utility attachment 14 is coupled to and driven by the rotary power source 12. The utility attachment 14 will perform longitudinal precision wood working tasks, such as making apertures in ends of wood pieces 16, in which a dowel can be inserted into two apertures in abutting ends of two wood pieces 16 to hold them together. The rotary power source 12 is a portable electric motor unit 18, having a ring angle drive shaft 20, an adjustable switch 22 and a handle 24 to be grasped by a hand of a person.

The utility attachment 14, as shown in FIGS. 1, 2 and 3, is a mini-chain saw unit 26. The mini-chain saw unit 26 includes a rectangular box shaped housing 28 having a pair of long side walls 30, a front wall 32 with an aperture 34 therethrough, an open top 36 and closed bottom panel 38. a pair of horizontal tracks 40 are provided. Each track 40 is formed on an inner surface of one long side wall 30 of the housing 28. A vertical guide plate 42 extends upwardly from the front wall 32 and braced thereto at 44. A height adjustment member 46 is slideably carried on the vertical guide plate 42. A slide support plate 48 is carried in the horizontal tracks 40 in the housing 28. The plate 48 has an aperture 50 therethrough.

A chain saw bar 52 is provided. A spring assembly 54 is for biasing the chain saw bar 52 horizontally to the underside of the slide support plate 48. A drive sprocket assembly 56 is mounted onto a top surface of the plate 48 to extend through the aperture 50. The drive sprocket assembly 56 is coupled to the rotary power source 12 to be driven therefrom. A cutting chain saw 58 extends about the chain saw bar 52 and the drive sprocket assembly 56. A forward end of the cutting chain saw 58 will extend through the aperture 34 in the front wall 32 of the housing 28, to cut horizontal flat slots into the ends of the wood pieces 16 to accommodate biscuit shaped dowels.

The mini-chain saw unit 26 further contains a rear door 60. A hinge 62 is between a back end of one long side wall 30 and a first end of the rear door 60. A latch 64 is on a second end of the rear door 60, so as to keep the rear door 60 closed on the housing 28. A stop 66 is on an inner surface of the rear door 60, to engage with the slide support plate 48 after the slide support plate 48 is inserted into the tracks 40 in the housing 28.

Figure 4:
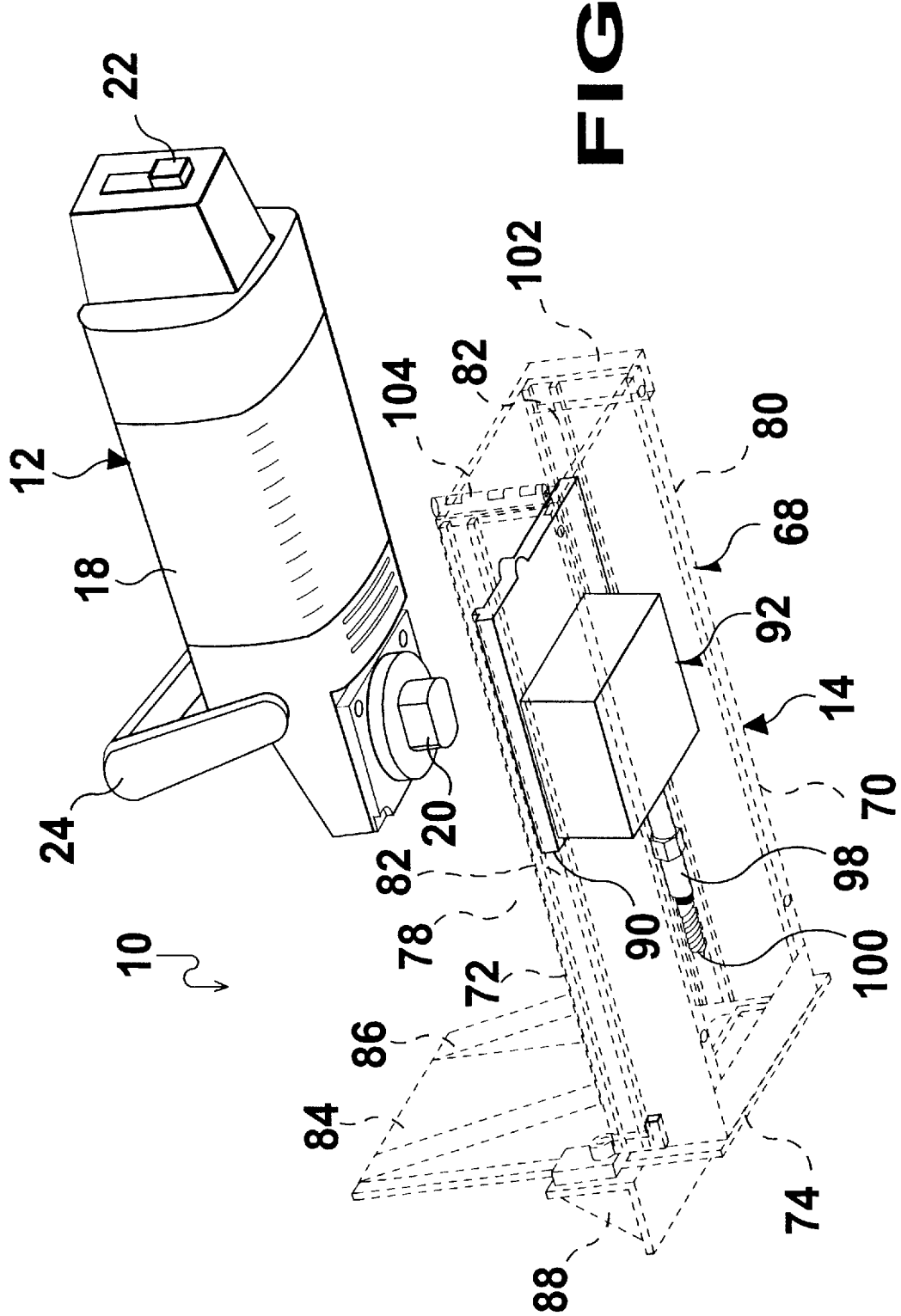
FIG. 4 is a perspective view of a second embodiment of the instant invention with the housing shown in phantom and ready to engage with the portable electric motor unit.
Figure 5:
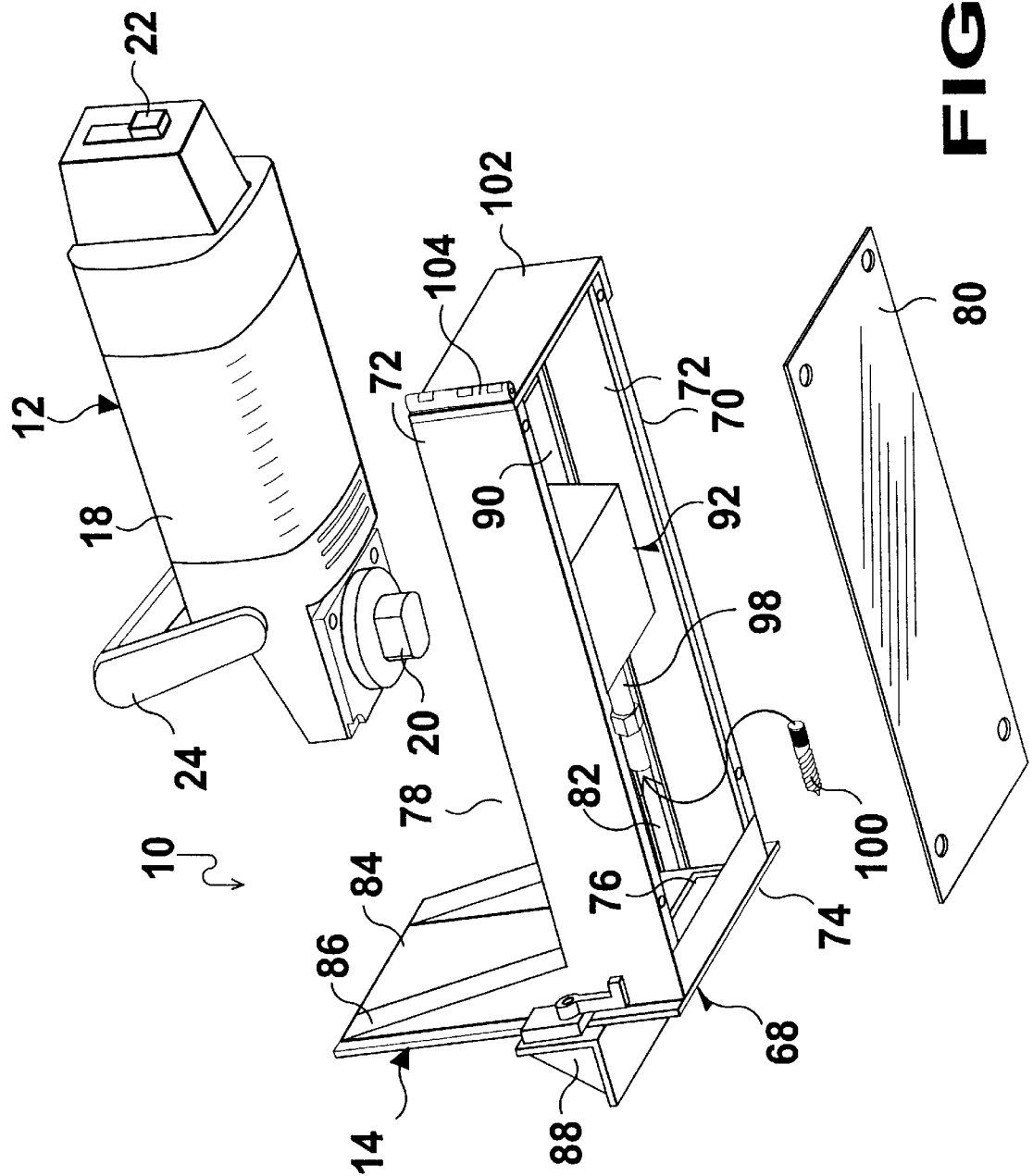
FIG. 5 is a perspective view similar to FIG. 4, with the housing shown solid and the bottom panel and threaded drill bit exploded therefrom.
Figure 6:
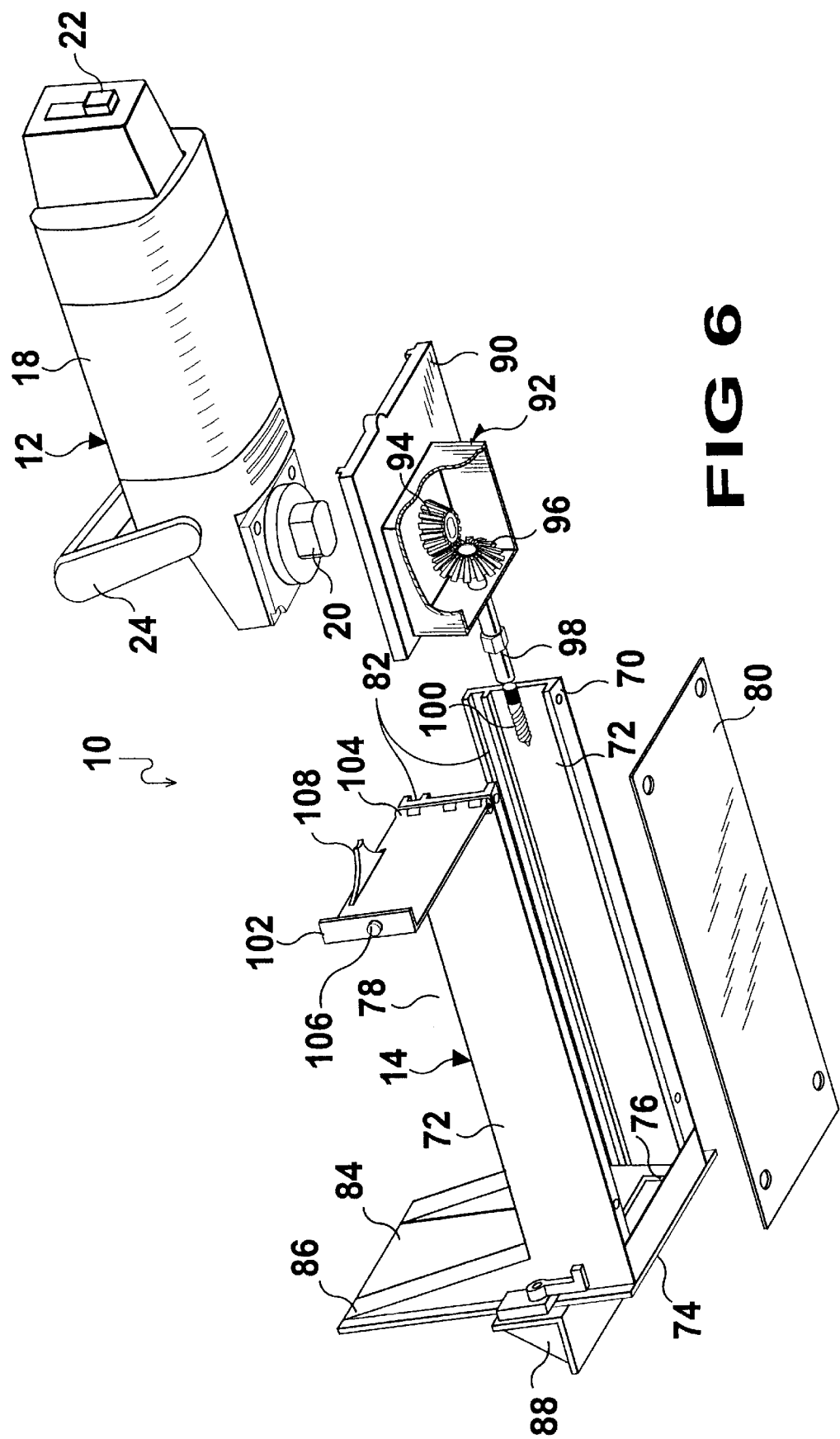
FIG. 6 is a perspective view similar to FIG. 5, with the gear box assembly broken away and exploded therefrom.

The utility attachment 14, as shown in FIGS. 4, 5 and 6, is a drill unit 68. The drill unit 68 includes a rectangular box shaped housing 70 having a pair of long side walls 72, a front wall 74 with an aperture 76 therethrough, an open top 78 and a removable bottom panel 80. A pair of horizontal tracks 82 are provided. Each track 82 is formed on an inner surface of one long side wall 72 of the housing 70. A vertical guide plate 84 extends upwardly from the front wall 74 and is braced thereto at 86. A height adjustment member 88, is slideably carried on the vertical guide plate 84.

A slide support plate 90 is carried in the horizontal tracks 82 in the housing 70. A gear box assembly 92 is mounted to the underside of the slide support plate 90. The gear box assembly 92 has a pair of right angled engaging bevel gears 94 and 96. The first bevel gear 94 is coupled to the rotary power source 12 to be driven therefrom, while the second bevel gear 96 drives a chuck 98. A threaded drill bit 100 is removably engaged with the chuck 98. The threaded drill bit 100 will extend through the aperture 76 in the front wall 74 of the housing 70, to drill horizontal cylindrical holes into the ends of the wood pieces to accommodate cylindrical shaped dowels.

The drill unit 68 further includes a rear door 102. A hinge 104 is between a back end of one long side wall 72 and a first end of the rear door 102. A latch 106 is on a second end of the rear door 102, so as to keep the rear door 102 closed on the housing 70. A stop 108 is on an inner surface of the rear door 102, to engage with the slide support plate 90 after the slide support plate 90 is inserted into the tracks 82 in the housing 70.

Figure 7:
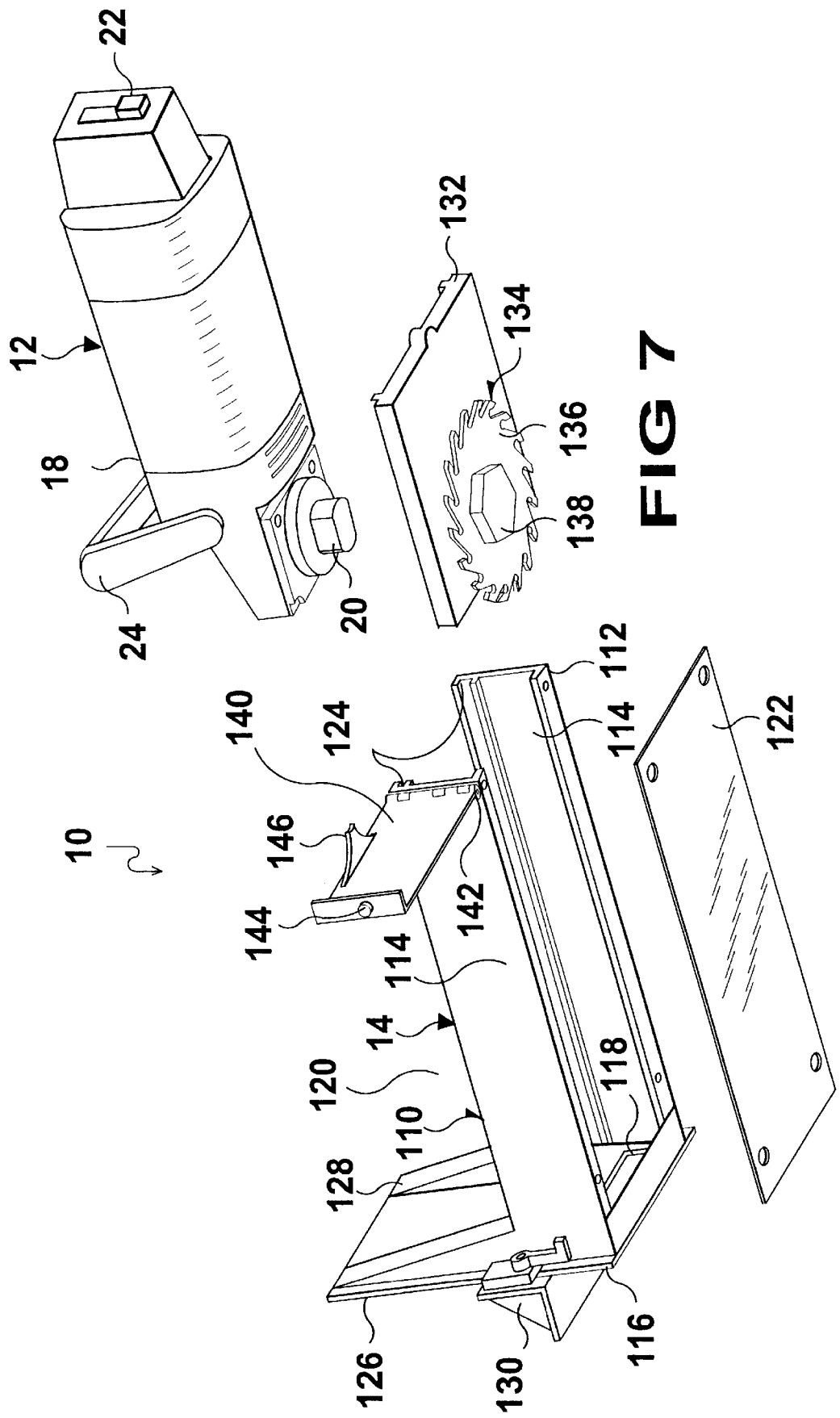
FIG. 7 is a perspective view of a third embodiment of the instant invention with the circular saw assembly and bottom panel exploded therefrom ready to engage with the portable electric motor unit.
Figure 8:
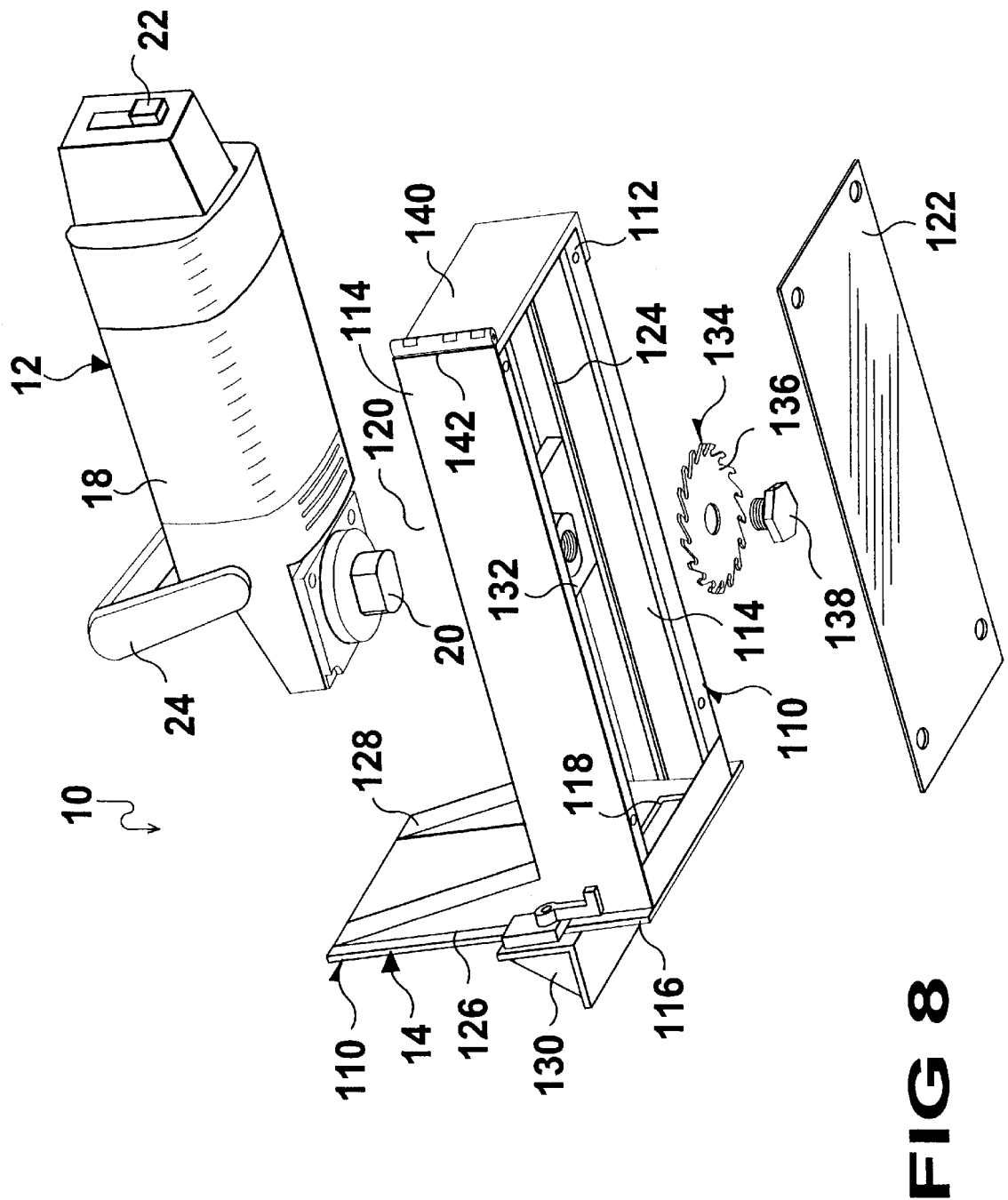
FIG. 8 is a perspective view similar to FIG. 7, showing the slide plate of the circular saw assembly installed within the housing and the circular saw blade exploded from the slide plate.
Figure 9:
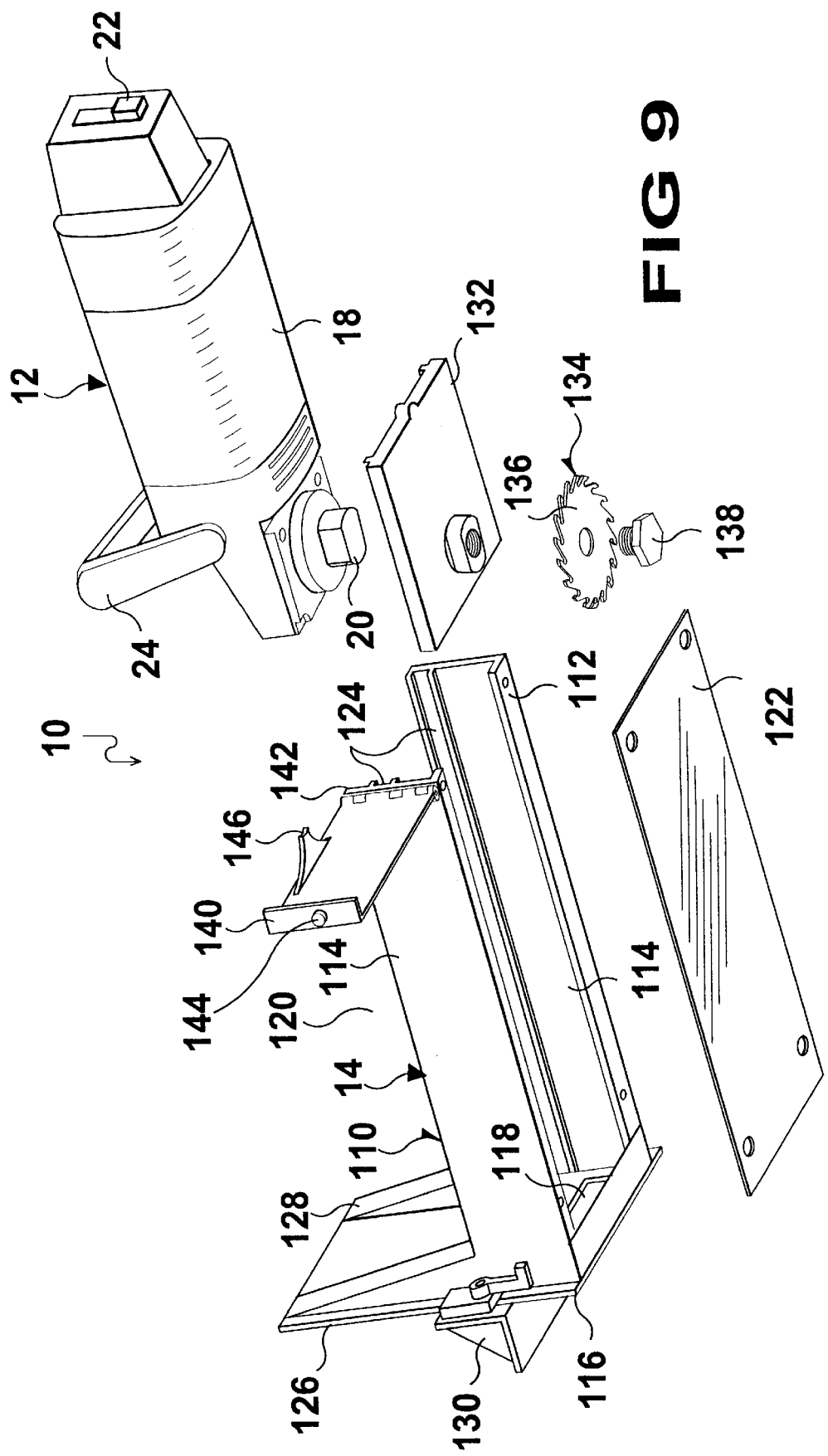
FIG. 9 is a perspective view similar to FIG. 8, showing the slide plate of the circular saw assembly exploded from the housing and the circular saw blade exploded from the slide plate.

The utility attachment 14, as shown in FIGS. 7, 8 and 9, is a circular saw unit 110. The circular saw unit 110 includes a rectangular box shaped housing 112 having a pair of long side wall 114, a front wall 116 with an aperture 118 therethrough, an open top 120 and a removable bottom panel 122. A pair of horizontal tracks 124 are provided. Each track 124 is formed on an inner surface of one long side wall 114 of the housing 112. A vertical guide plate 126 extends upwardly from the front wall 116 and is braced thereto at 128. A height adjustment member 130 is slideably carried on the vertical guide plate 126.

A slide support plate 132 is carried in the horizontal tracks 124 in the housing 112. A circular saw assembly 134 is mounted to the underside of the slide support plate 132. The circular saw assembly 134 has a circular saw blade 136 rotatively affixed thereto with a bolt 138 and is coupled to the rotary power source 12 to be driven therefrom. A portion of the circular saw blade 136 will extend through the aperture 118 in the front wall 116 of the housing 112, to cut horizontal flat slots into the ends of the wood pieces 16 to accommodate biscuit shaped dowels.

The circular saw unit 110 further includes a rear door 140. A hinge 142 is between a back end of one long side wall 114 and a first end of the rear door 140. A latch 144 is on a second end of the rear door 140, so as to keep the rear door 140 closed on the housing 112. A stop 146 is on an inner surface of the rear door 140, to engage with the slide support plate 132 after the slide support plate 132 is inserted into the tracks 124 in the housing 112.

The cutting teeth of the cutting chain saw 58 can be made of a hardened steel with a carbide tip. The threaded drill bit 100 can be made of the hardened steel with the carbide tip. The cutting teeth of the circular saw blade 136 can also be made of the hardened steel with the carbide tip.

LIST OF REFERENCE NUMBERS 10 universal hand tool joiner device
12 rotary power source of 10
14 utility attachment of 10
16 wood piece
18 portable electric motor unit for 12
20 right angle drive shaft on 18
22 adjustable switch on 18
24 handle on 18
26 mini-chain saw unit for 14
28 rectangular box shaped housing of 26
30 long side wall of 28
32 front wall of 28
34 aperture in 32
36 open top of 28
38 closed bottom panel of 28
40 horizontal track of 26 in 30
42 vertical guide plate of 26
44 brace for 42
46 height adjustment member of 26
48 slide support plate of 26
50 aperture in 48
52 chain saw bar of 26
54 spring assembly of 26 for 52
56 drive sprocket assembly of 26
58 cutting chain saw of 26
60 rear door of 26
62 hinge between 30 and 60
64 latch on 60
66 stop on 60
68 drill unit for 14
70 rectangular box shaped housing of 68
72 long side wall of 70
74 front wall of 70
76 aperture in 74
78 open top of 70
80 removable bottom panel of 70
82 horizontal track of 68 in 72
84 vertical guide plate of 68
86 brace for 84
88 height adjustment member of 68
90 slide support plate of 68
92 gear box assembly of 68
94 first bevel gear in 92
96 second bevel gear in 92
98 chuck for 96
100 threaded rill bit of 68 in 98
102 rear door of 68
104 hinge between 72 and 102
106 latch on 102
108 stop on 102
110 circular saw unit for 14
112 rectangular box shaped housing of 110
114 long side wall of 112
116 front wall of 112
118 aperture in 116
120 open top of 112
122 removable bottom panel of 112
124 horizontal track of 110 in 114
126 vertical guide plate of 110
128 brace for 126
130 height adjustment member of 110
132 slide support plate of 110
134 circular saw assembly of 110
136 circular saw blade of 134
138 bolt of 134
140 rear door of 110
142 hinge between 114 and 140
144 latch on 140
146 stop on 140

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A universal hand tool joiner device comprising:
   a) a rotary power source; and
   b) a utility attachment coupled to and driven by said rotary power source, so that said utility attachment will perform longitudinal precision wood working tasks, wherein said utility attachment is a mini-chain saw unit including:
      i) a rectangular box-shaped housing having a pair of long side walls, a front wall with an aperture therethrough, an open top and closed bottom panel;
      ii) a pair of horizontal tracks, each said track formed on an inner surface of one said long side wall of said housing;
      iii) a vertical guide plate extending upwardly from said front wall and braced thereto;
      iv) a height adjustment member, slideably carried on said vertical guide plate;
      v) a slide support plate carried in said horizontal tracks in said housing, said plate having an aperture therethrough;
      vi) a chain saw bar;
      vii) a spring assembly for biasing said chain saw bar horizontally to the underside of said slide support plate;

viii) a drive sprocket assembly mounted onto a top surface of said plate to extend through said aperture, said drive sprocket assembly is coupled to said rotary power source to be driven therefrom; and ix) a cutting chain saw extending about said chain saw bar and said drive sprocket assembly, so that a forward end of said cutting chain saw will extend through said aperture in said front wall of said housing, to cut horizontal flat slots into the ends of the wood pieces to accommodate biscuit shaped dowels.

2. A universal hand tool joiner device as recited in claim 1, wherein said rotary power source is a portable electric motor unit having a right angle drive shaft, an adjustable switch and a handle to be grasped by a hand of a person.

3. A universal hand tool joiner device as recited in claim 1, wherein said mini-chain saw unit further includes:

a) a rear door;

b) a hinge between a back end of one said long side wall and a first end of said rear door;

c) a latch on a second end of said rear door, so as to keep said rear door closed on said housing; and d) a stop on an inner surface of said rear door to engage with said slide support plate after said slide support plate is inserted into said tracks in said housing.

4. A universal hand tool joiner device as recited in claim 2, wherein said mini-chain saw unit further includes:

a) a rear door;

b) a hinge between a back end of one said long side wall and a first end of said rear door;

c) a latch on a second end of said rear door, so as to keep said rear door closed on said housing; and d) a stop on an inner surface of said rear door to engage with said slide support plate after said slide support plate is inserted into said tracks in said housing.

* * * * *